(12) United States Patent
Pondelick et al.

(10) Patent No.: US 7,998,250 B2
(45) Date of Patent: Aug. 16, 2011

(54) MULTIPLE VORTEX WASTE SEPARATOR APPARATUS

(75) Inventors: Mark A. Pondelick, Rockford, IL (US);
Christopher Hardwick, Roscoe, IL (US); Derek Vaughan, Pincourt (CA);
Thao Hoang, Rockford, IL (US);
Michael Funk, Rockford, IL (US)

(73) Assignee: B/E Aerospace, Inc., Wellington, FL (US)

( * ) Notice: Subject to any disclaimer, the term of this patent is extended or adjusted under 35 U.S.C. 154(b) by 421 days.

(21) Appl. No.: 12/245,541

(22) Filed: Oct. 3, 2008

(65) Prior Publication Data

US 2010/0084352 A1    Apr. 8, 2010

(51) Int. Cl.
*C02F 1/20* (2006.01)
(52) U.S. Cl. ............... 95/258; 95/261; 96/190; 96/195; 96/212; 96/191; 4/DIG. 19
(58) Field of Classification Search ............... 95/258, 95/261; 96/190, 195, 212, 191, 209, 210, 96/211; 4/320, 321, DIG. 19
See application file for complete search history.

(56) References Cited

U.S. PATENT DOCUMENTS

| | | | | |
|---|---|---|---|---|
| 2,187,646 A * | 1/1940 | Darrieus | ............ | 95/261 |
| 2,708,033 A | 5/1955 | Thomas | | |
| 2,757,582 A * | 8/1956 | Boadway et al. | ............ | 209/17 |
| 3,616,617 A | 11/1971 | De Groote | | |
| 3,902,876 A | 9/1975 | Moen et al. | | |
| 4,289,611 A | 9/1981 | Brockmann | | |
| 4,385,912 A * | 5/1983 | Parrick et al. | ............ | 55/329 |
| 4,469,497 A | 9/1984 | Linhardt | | |
| 4,612,120 A | 9/1986 | Box | | |
| 4,919,802 A * | 4/1990 | Katsura | ............ | 422/44 |
| 4,968,325 A | 11/1990 | Black et al. | | |
| 5,002,592 A * | 3/1991 | Stroby et al. | ............ | 96/167 |
| 5,026,407 A | 6/1991 | Tobey | ............ | 55/337 |
| 5,234,483 A * | 8/1993 | Tertre et al. | ............ | 55/337 |
| 5,510,019 A * | 4/1996 | Yabumoto et al. | ............ | 210/137 |
| 5,538,546 A * | 7/1996 | Ashton et al. | ............ | 96/195 |
| 5,644,802 A * | 7/1997 | Olin | ............ | 4/431 |
| 6,019,825 A * | 2/2000 | Greene et al. | ............ | 96/209 |
| 6,156,192 A * | 12/2000 | Rummler | ............ | 210/153 |
| 6,206,943 B1 * | 3/2001 | Friesen et al. | ............ | 55/320 |
| 6,402,799 B1 | 6/2002 | Kokubo et al. | | |
| 6,468,426 B1 * | 10/2002 | Klass | ............ | 210/304 |
| 6,502,278 B2 | 1/2003 | Oh et al. | | |
| 6,546,593 B2 | 4/2003 | Oh et al. | | |
| 7,169,305 B2 | 1/2007 | Gomez | | |
| 2002/0145080 A1 | 10/2002 | Renken et al. | | |
| 2005/0173336 A1 | 8/2005 | Arnaud | | |
| 2005/0218088 A1 * | 10/2005 | Gonzalez et al. | ............ | 210/788 |

* cited by examiner

*Primary Examiner* — Duane Smith
*Assistant Examiner* — Douglas Theisen
(74) *Attorney, Agent, or Firm* — Drinker Biddle & Reath LLP

(57) ABSTRACT

A multiple vortex separator for drawing a substantially moisture-free airstream from a waste stream having an annular channel defining a first vortex flow path for separating liquid and solid waste from this waste stream and an inverted conical cavity between nested inverted cones defining a second vortex flow path that is isolated from the first vortex flow path for separating additional liquid and solid waste from the waste stream before it exits the vortex separator.

25 Claims, 3 Drawing Sheets

MULTIPLE VORTEX WASTE SEPARATOR APPARATUS

FIELD OF THE INVENTION

This invention pertains to systems for separating aircraft waste and, more particularly, to a multiple vortex apparatus for removing solid and liquid waste from a waste stream from aircraft toilets or other receptacles while withdrawing a substantially moisture-free airstream under suction.

BACKGROUND OF THE INVENTION

Various systems are available in the art that employ a vacuum to transport liquid and solid waste material from aircraft toilets or other receptacles to a waste tank for storage. The waste material that is transported includes solid human waste, urine, water, optionally cleansing and disinfecting chemicals, air, toilet paper, food, and often unexpected discarded items, all of which are drawn from the aircraft toilets or other receptacles to one or more waste tanks. The waste tanks, of course, are emptied during ground servicing of the aircraft.

The suction that transports the waste material to a waste tank is usually provided by a vacuum generator when the aircraft is on the ground or at low altitudes. At higher altitudes, the system typically will be vented to the external lower pressure atmosphere, creating a pressure differential between the exterior atmosphere and the interior of the aircraft to draw the waste material from the aircraft toilets or other receptacles for transport to the waste tank for storage.

As the waste material is transported to the waste tank, the air which was drawn along with the waste material must be released to the atmosphere. This air must be free of moisture and particulate solids for sanitary and for safety reasons. As to sanitary concerns, it is obviously undesirable to release particulate human waste into the atmosphere, either when the aircraft is airborne or when it is on the ground. Additionally, there is a danger that if a substantial amount of water escapes the aircraft from such a vacuum driven aircraft waste collection system, it may build up on the aircraft fuselage to form ice.

Conventional aircraft waste material separation systems are large and so require excessive space in the aircraft while contributing unnecessarily to the aircraft weight, reducing its fuel efficiency. Also, conventional waste material separation systems require frequent servicing, which is often difficult and time-consuming to perform because of inconvenient access to the separator apparatus. Additionally, conventional waste material separation systems typically have two separators, one at the inlet and another at the outlet of the systems. Finally, conventional separation apparatus, while often effective in removing moisture from the waste material under optimal conditions, could nevertheless be improved by ensuring that the apparatus consistently prevents the escape of moisture.

Thus, the need exists for an improved waste material separation system using a single separator making for an overall system that is compact and lightweight without compromising its performance. It should also be consistently effective in minimizing or preventing the escape of moisture in the outgoing airstream. Additionally, the apparatus must be capable of being easily and safely replaced with minimal exposure to the collected waste. Finally, the apparatus should also be capable of being easily installed in the limited space available in the aircraft. The present invention satisfies all of these requirements and has other benefits as well.

BRIEF SUMMARY OF THE INVENTION

The present invention comprises a multiple vortex separator for drawing a substantially moisten-free airstream from a waste stream containing liquid and solid waste. The separator is particularly well adapted for use in aircraft. The separator of the invention includes a housing, which is preferably cylindrical in shape, and has a waste inlet for receiving the waste stream. The top of the cylindrical housing is enclosed and has an exhaust port for drawing the substantially moisture-free airstream from the housing by way of suction force provided by a vacuum generator or, at high altitudes, the pressure differential between the exterior atmosphere and the interior of the aircraft.

An annular channel is positioned along the inner surface of the cylindrical wall of the housing. This channel defines a first vortex path for separating liquid and solid waste from the waste stream. The annular channel is in communication with the waste inlet.

A pair of nested inverted cones is located within the cylindrical housing. These cones define an inverted conical cavity that is in communication with the exhaust port. A second vortex flow path which forms within the conical cavity thus is isolated from the first vortex path.

Accordingly, a waste stream containing liquid and solid waste is drawn into the housing through the waste inlet by a suction force applied to the exhaust port. The entering waste stream encounters the annular channel along the inner surface of the housing wall, moving in a first vortex flow path in which liquid and solid wastes are separated from the waste stream by centrifugal force. As a result, the heavier waste materials move to the outside of the annular channel and fall downwardly for collection as appropriate. The remaining lighter airstream enters the inverted conical cavity between the nested cones in a second vortex path that is isolated from the first vortex path. Additional liquid and solid waste is removed from the airstream moving through the conical cavity again by centrifugal force to produce a substantially moisture-free airstream which exits from the vortex separator through the exhaust port. The source of suction will be either the cabin to atmosphere differential at high altitudes or a vacuum generator at low altitudes.

In a preferred embodiment, radially disposed vanes are positioned adjacent the entrance of the conical cavity. These vanes are angled about their radial axes to form angled slots for inducing and enhancing rotary motion in the airstream passing through the slots into the conical cavity.

The inner surface of the inner cone defines an inner conical chamber. A barrier extends between the cones forming a top closure of the conical cavity. Finally, at least one interconnecting port is located in this top closure communicating between the conical cavity and the inner conical chamber. Thus, the airstream moving through the separator passes from the conical cavity into the inner conical chamber through the interconnecting port.

The inner conical chamber may have a check valve at its bottom adapted to open when the separator is not drawing a waste stream into the cylindrical housing. When this happens, liquid and solid waste that has collected in the inner conical chamber will fall from the chamber to be collected as appropriate. Also, a filter medium may be disposed in the chamber to coalesce moisture remaining in the airstream that passes through the chamber.

Finally, an exhaust member may be generally centered in the conical chamber. The exhaust member has an annular shelf positioned above the chamber and the top closure of the cones. It also has a central tubular portion projecting downwardly into the chamber defining an exit conduit leading from the chamber to the top of the cylindrical housing of the separator. Thus, the airstream exiting the chamber will pass through the tubular portion before being removed from the top of the housing via the exhaust port. Finally, a demister filter may be disposed across the top opening of the tubular portion to help remove any remaining moisture in the exiting airstream.

BRIEF DESCRIPTION OF THE DRAWINGS

In order to aid in understanding the invention, it will now be described in connection with exemplary embodiments thereof with reference to the accompanying drawings in which like numerical designations will be given to like features with reference to the accompanying drawings wherein.

DETAILED DESCRIPTION OF A PREFERRED EMBODIMENT OF THE INVENTION

The embodiment of the invention described below is not intended to be exhaustive or to limit the invention to the precise structure and operation disclosed. Rather, the embodiment described in detail below has been chosen and described to explain the principles of the invention and its application, operation and use in order to best enable others skilled in the art to follow its teachings.

Figure 1:
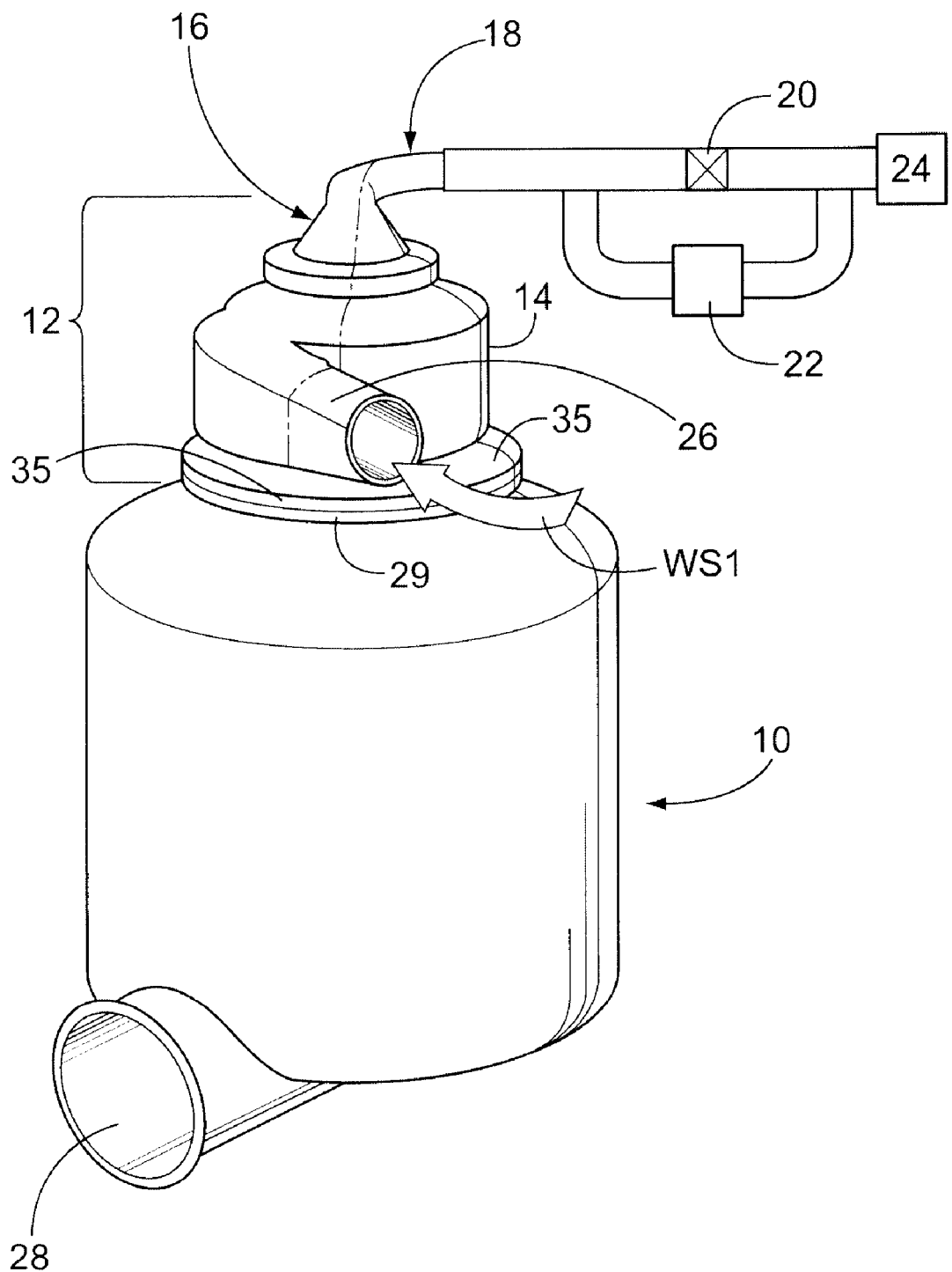
FIG. 1 is a perspective view of the exterior of a waste tank fitted with a vortex separator in accordance with the present invention.

Turning now to FIG. 1, the exterior of a waste tank 10 having a multiple vortex waste separator 12 in accordance with the invention is illustrated. The vortex separator 12 includes a housing 14 that is preferably cylindrical as shown and an exhaust cap 16 with an exhaust port atop the housing. The exhaust cap may be removably clamped to the top of the cylindrical housing to permit access to the interior of the separator when desired. Exhaust tube 18 will be connected as shown diagrammatically to a source of suction comprising a vacuum generator 22 at low altitudes or the external atmosphere at high altitudes 24 to draw waste from aircraft toilets or other receptacles by way of the vortex separator. The switching is achieved with an altitude-sensitive bypass check valve 20.

Vortex separator 12 has an inlet tube 26 which in an aircraft functions to transport the waste stream from an aircraft toilet or other receptacle to the separator. The inlet tube thus, e.g., receives a waste stream comprising air, waste water, waste solids, and other materials from the aircraft toilet when it is flushed. This stream, which is represented diagrammatically by arrow WS1, is drawn into vortex separator 12 by suction provided either by the pressure differential at high elevations or by the operation of a vacuum generator at low altitudes applied at exhaust tube 18. The vacuum generator preferably will produce a vacuum of about 3-9 inches Hg. At an altitude of about 16,000 feet, the system will switch from the vacuum generator to the cabin-to-atmosphere differential by way of the operation of check valve 20 to draw the waste stream into the separator. Finally, waste tank 10 includes a drain tube 28 at its bottom which will be connected to a waste removal port on the outside of the aircraft (not shown) through which waste collected in tank 10 will be drained during servicing of the aircraft.

Figure 2:
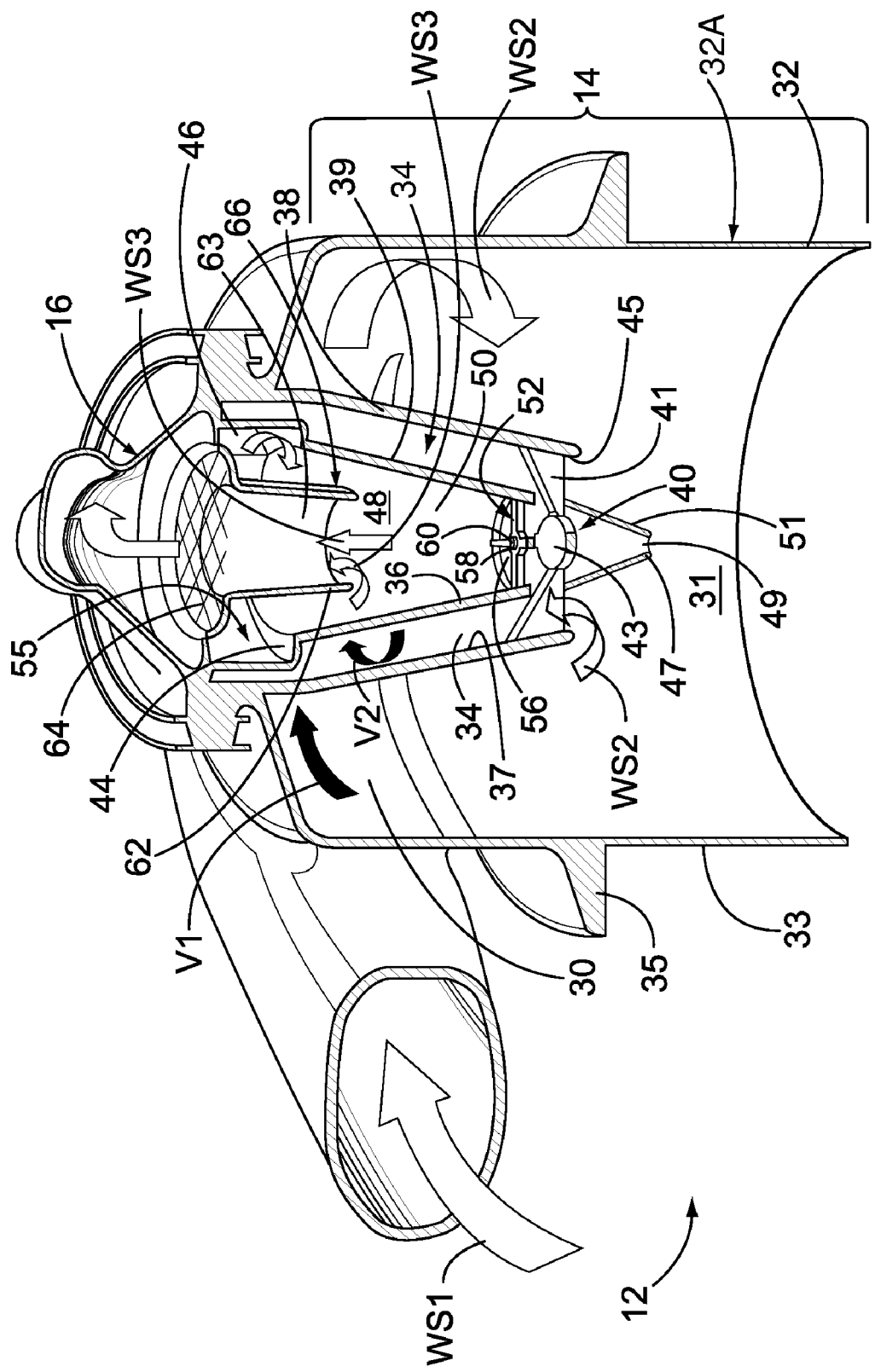
FIG. 2 is a partial cut-away view of the vortex separator and waste tank of FIG. 1.

As can be seen in the cut-away view of FIG. 2 which illustrates the internal structure of vortex separator 12, the vortex separator includes an annular channel 30 in communication with inlet tube 26 formed into inner wall 31 of annular wall 32 of cylindrical housing 14. It should be noted that the lower portion 33 of wall 32 extends into waste tank 10 with an outer annular lip 35 encircling the outer surface 32A of the wall resting on a corresponding lip 29 of the tank so that the two may be removably clamped together (FIG. 1).

Thus, the vacuum applied at exhaust tube 18 is transmitted across the vortex separator to draw stream WS1 into inlet tube 26 under high velocity. This high velocity stream is directed by inlet tube 26 into annular channel 30 which defines a first vortex flow path V1. As stream WS1 moves in flow path V1 a lighter airstream WS2 migrates to the center of the separator cylindrical housing as most of the heavier solids and liquids move to the outside and fall out of stream WS1 to the bottom of waste tank 10.

The next important feature is an inverted truncated conical cavity 34 between an inner inverted cone 36 nested within an outer inverted cone 38. Thus, the inner surface 37 of outer inverted cone 38 and the outer surface 39 of inner inverted cone 36 define inverted conical cavity 34 which is generally centered within housing 14. Nested cones 36 and 38 are mounted below exhaust cap 16, and are interconnected by a support structure 40 at the entrance to the conical cavity having vanes 41 extending radially outwardly from a hub 43. The vanes are angled about their radial axes to form angled slots for inducing rotary motion in the airstream passing through the slots into conical cavity 34 to the second vortex path. Support structure 40 maintains the spacing between the cones without obstructing passage of material from the conical cavity in the space between the vanes. A funnel 47 is located below the nested cones. The funnel 47 positioned below the nested cones has a maximum radius less than the minimum radius of the outer inverted cone 38 for diverting the airstream WS2 into the conical cavity 34. The outer surface 51 of the funnel helps divert the lighter airstream WS2 into inverted conical cavity 34.

Figure 3:
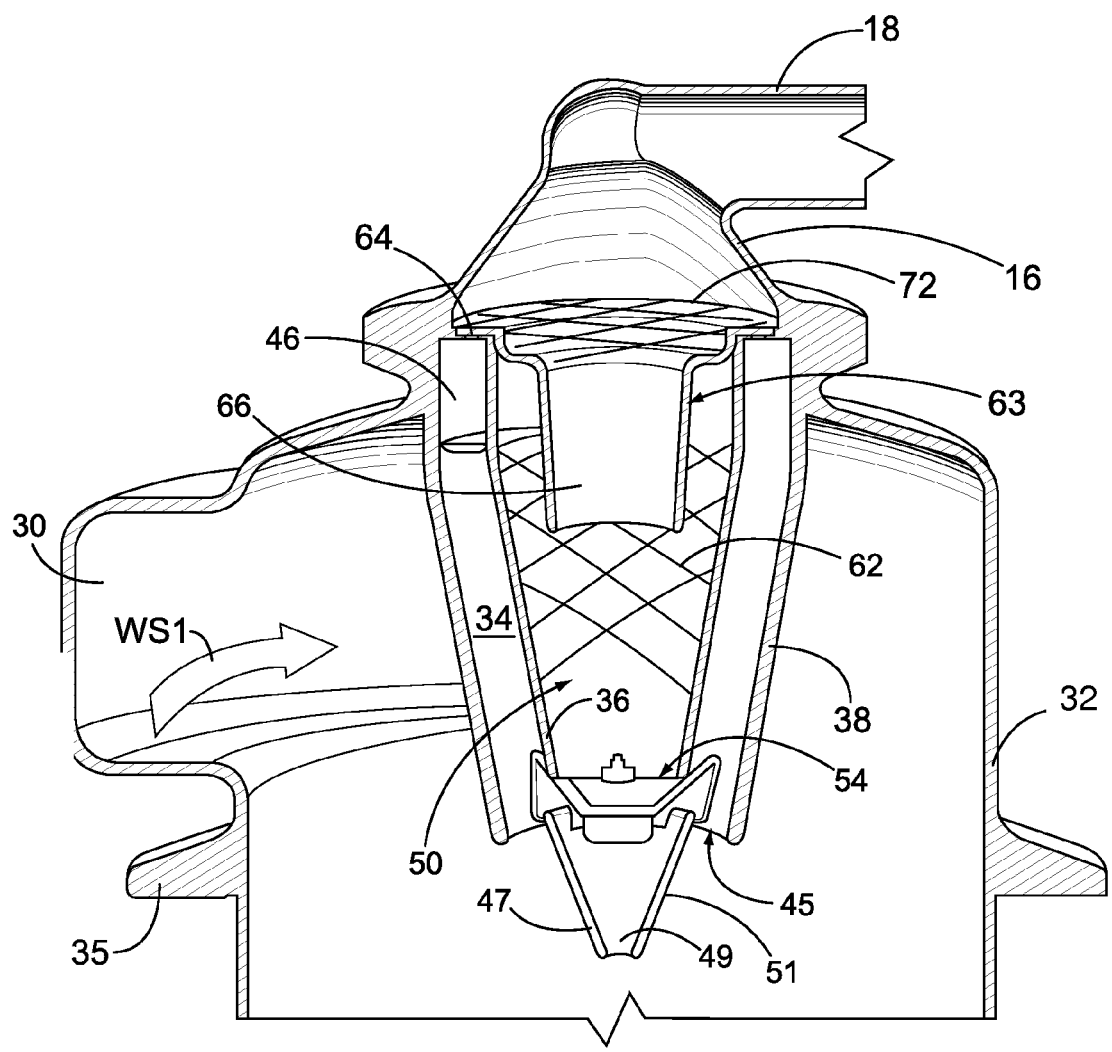
FIG. 3 is an enlarged view of the vortex separator of FIG. 1.

The nested truncated cones also define an annular opening 45 (FIG. 3) along their bottom edge into which airstream WS2 is drawn, and from which heavier material will fall from conical cavity 34 past vanes 41 as will be explained in more detail below. Finally, the top edge of the nested cones is generally closed off by an annular top closure 44 which has a port 46 through which air may be transported from the conical cavity. A second like port is located 180° opposite port 46 but is hidden in the Figures.

Airstream WS2 therefore is drawn up through the conical cavity by the suction force applied at exhaust tube 18. Due to the nesting of the cones this stream can only travel between the walls of the cones. As a result of the fan-like strut structure, the conical shape of cavity 34, and the high velocity, stream WS2 will move through cavity 34 in a second vortex flow path V2 which, as can be seen in FIG. 2, is isolated from vortex flow path V1. Vortex flow path V2 again produces a centrifugal force that causes remaining heavier materials (particulate waste & liquid) to move to the outside where it will fall down through conical cavity 34 and annular opening 45 at the bottom of the nested cones into tank 10. Meanwhile, the remaining lighter airstream WS3 will pass upwardly through port 46 in top closure 44 to be drawn down into an inner inverted truncated conical chamber 50 defined by the inner surface 48 of cone 36.

A waste check valve 60 is located at the bottom 54 of chamber 50. This check valve comprises an inverted umbrella-shaped rubber membrane 52 supported below strut structure 56 by a central upwardly projecting locking member 58 that is mounted in a hole at the center of the strut structure. The check valve allows solids and liquids to fall from truncated conical chamber 50 to funnel 47 and out bottom funnel opening 49 to waste tank 10 but does not allow contaminated air from below the check valve to enter the chamber, as explained below. As is illustrated diagrammatically in FIG. 3, chamber 50 also contains a first filter material 62 which helps coalesce remaining moisture as the stream moves through truncated conical chamber 50 to leave a further portion of waste stream WS3 with at most minimal amounts of moisture as it exits chamber 50.

Stream WS3 next enters an exhaust member 63 having an annular shelf 64 resting at the top of cone 36 and a tubular portion 66 centered above chamber 50, with tubular portion 66 extending partially into the chamber and the annular flange supporting the exhaust member across the top of the nested cones. Shelf 64 rests below exhaust cap 16 of the vortex separator. Preferably, a demister filter material 72 is disposed across the top opening of tubular portion 66 to trap moisture and help demist entrained moisture moving past the mesh through cap 16 and out exhaust tube 18. Both filter materials 62 and 72 preferably are in the form of a dense knitted mesh of metal, nylon or propylene. Thus, filter material 72 is positioned to remove most if not all of the moisture remaining in stream WS3, so that the airstream moving out through exhaust tube 18 to the outside atmosphere will be free of moisture.

The device will operate when the flush cycle of the airplane toilet is initiated. When this happens, waste stream WS1 will be drawn from the toilet through inlet tube 26 into annular channel 30 and first vortex flow path V1 in which the resulting centrifugal force causes the heavier components of the waste mixture to move to the outside and fall into waste tank 10, as discussed earlier.

Meanwhile, a remaining rapidly moving vortex comprising stream WS2 enters inverted truncated conical cavity 34 through the angled slots between vanes 41 and the remaining solids and water are further separated by the centrifugal force produced in a second vortex flow path V2 causing additional solids and water to fall into waste tank 10, leaving remaining waste stream WS3 as an airstream substantially free of solids and with a substantially reduced level of liquids. WS3 is then drawn from the center of the separator cylindrical housing into conical cavity 34 through port 46 along annular channel 55 of closure 44 and into inverted conical chamber where it passes up through first filter material 62 which helps coalesce entrained liquid in stream WS3 so that it accumulates and falls to the bottom of the inverted conical chamber. As a result, when the vacuum in the system is no longer applied, check valve 60 will open under the weight of the accumulated material at the bottom of chamber 50 so that this waste material can move past the check valve into funnel 47 from which it will fall through bottom funnel opening 49 to the bottom of tank 10 joining the earlier separated waste.

It should be noted that vortices V1 and V2 do not intersect. This is an important feature of the invention since intermingling of crossing high velocity waste streams moving through the vortices would cause additional particulate moisture and solids to be formed significantly reducing the effectiveness of the separator.

Finally, the remaining stream WS3 passes from exhaust chamber tubular portion 66 of exhaust member 63 through demister filter 72 where it passes through exhaust cap 16 into exhaust tube 18 to either the vacuum generator or the atmosphere if the aircraft is operating at a high altitude. Typically, the above process, from the application of the vacuum through the completion of the separation process will take about 1 to 4 seconds.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A multiple vortex separator for removing solid and liquid waste from a waste stream while withdrawing a substantially moisture-free airstream under suction comprising:
    a housing having an outer wall with an inner surface, a waste inlet for receiving the waste stream, and an enclosed top with an exhaust port for withdrawing the substantially moisture-free airstream from the housing;
    an annular channel along the inner surface of the wall defining a first vortex flow path for separating liquid and solid waste from the waste stream, the annular channel being in communication with the inlet; and
    inner and outer nested cones within the housing defining an inverted conical cavity between the cones, the conical cavity being in communication with the exhaust port and forming a second vortex flow path isolated from the first vortex flow path for separating additional liquid and solid waste from the waste stream before it is withdrawn from the exhaust port.

2. The multiple vortex separator of claim 1 including an exhaust cap removably clamped atop the housing, where the exhaust port is located in the cap.

3. The multiple vortex separator of claim 2 in which the nested cones are mounted directly below the exhaust cap.

4. The multiple vortex separator of claim 1 in which a source of suction is connected to the exhaust port for withdrawing the substantially moisture-free airstream from the housing and a waste stream containing liquid and solid waste is connected to the inlet.

5. The multiple vortex separator of claim 4 in which the multiple vortex separator is disposed in an aircraft and the source of suction is either a vacuum generator or the differential pressure between the interior of the aircraft and the outside atmosphere.

6. The multiple vortex separator of claim 5 including a conduit for transporting the waste stream from an aircraft toilet to the separator.

7. The multiple vortex separator of claim 1 in which the vortex separator is mounted to a waste tank having a drain for removing waste collected in the tank.

8. The multiple vortex separator of claim 7 in which the vortex separator includes a lower portion that extends into the waste tank, the lower portion having an outer annular lip and the tank having a corresponding outer annular lip, and the two annular lips being removably clamped together.

9. The multiple vortex separator of claim 1 in which radially disposed vanes are positioned adjacent the entrance to the conical cavity, the vanes being angled about their radial axes to form angled slots for inducing rotary motion in the airstream passing through the slots into the conical cavity.

10. The multiple vortex separator of claim 1 including a barrier extending between the cones forming a top closure of the conical cavity, and an inner inverted conical chamber defined by the inner surface of the inner cone, the top closure having a port communicating between the inverted conical cavity and the inverted conical chamber.

11. The multiple vortex separator of claim 10 including a check valve at the bottom of the inverted conical chamber adapted to open when the multiple vortex separator is not subject to a suction force.

12. The multiple vortex separator of claim 10 including a filter media disposed in the chamber to coalesce moisture in the airstream passing through the chamber.

13. The multiple vortex separator of claim 10 including an exhaust member generally centered within the conical chamber having an annular shelf positioned above the chamber and a tubular portion projecting into the chamber.

14. The multiple vortex separator of claim 13 including a demister filter disposed across the top opening of the tubular portion.

15. The multiple vortex separator of claim 1 including a funnel positioned below the nested cones having a maximum radius less than the minimum radius of the outer cone for diverting the airstream into the conical cavity.

16. A multiple vortex separator for removing solid and liquid waste from a waste stream from aircraft toilets or other receptacles while withdrawing a substantially moisture-free airstream under suction comprising:
  a housing having an outer wall with an inner surface, a waste inlet for receiving the waste stream, and an enclosed top with an exhaust port for withdrawing the substantially moisture-free airstream from the housing;
  an annular channel along the inner surface of the wall defining a first vortex flow path for separating liquid and solid waste from the waste stream, the annular channel being in communication with the inlet;
  inner and outer nested cones within the housing defining an inverted conical cavity between the cones, the conical cavity being in communication with the exhaust port and forming a second vortex flow path isolated from the first vortex flow path for separating additional liquid and solid waste from the waste stream before it enters the exhaust port;
  an exhaust cap atop the housing and an exhaust port located in the cap; and
  a source of suction connected to the exhaust port for withdrawing the substantially moisture-free airstream from the housing and a waste stream containing liquid and solid waste connected to the inlet.

17. The multiple vortex separator of claim 16 in which radially disposed vanes are positioned adjacent the entrance to the conical cavity, the vanes being angled about their radial axes to form angled slots for inducing rotary motion in the airstream passing through the slots into the conical cavity.

18. The multiple vortex separator of claim 16 including a barrier extending between the cones forming a top closure of the conical cavity, and an inner inverted conical chamber defined by the inner surface of the inner cone, the top closure having a port communicating between the inverted conical cavity and the inverted conical chamber.

19. The multiple vortex separator of claim 18 including a check valve at the bottom of the inverted conical chamber adapted to open when the multiple vortex separator is not subject to a suction force.

20. The multiple vortex separator of claim 18 including a filter media disposed in the chamber to coalesce moisture in the airstream passing through the chamber.

21. The multiple vortex separator of claim 18 including an exhaust member generally centered within the conical chamber having an annular shelf positioned above the chamber and a tubular portion projecting into the chamber opening below the exhaust port in which a demister filter is disposed across the top opening of the tubular portion.

22. The multiple vortex separator of claim 16 including a funnel positioned below the nested cones having a maximum radius less than the minimum radius of the outer cone for diverting the airstream into the conical cavity.

23. The multiple vortex separator of claim 7 in which no other separator is associated with the tank for removing the solid and liquid waste from the waste stream while withdrawing a substantially moisture-free airstream under suction.

24. A method of drawing a substantially moisture-free airstream from a waste stream containing liquid and solid waste comprising:
  drawing the waste stream containing liquid and solid waste into an annular channel defining a first vortex flow path in a cylindrical housing so that heavier solids and liquids move to the outside of the housing and fall downwardly while a lighter airstream containing remaining moisture particles migrate to the center of the housing; and
  drawing the remaining lighter airstream into an inverted conical cavity in a second vortex flow path isolated from the first vortex flow path to produce a centrifugal force causing remaining heavier materials to fall through the conical cavity and the remaining lighter airstream to be drawn from the conical cavity.

25. The method of claim 24 in which the remaining lighter airstream is drawn past radially disposed angled vanes as it enters the inverted conical cavity.

* * * * *